3,352,641
RECOVERY OF IODIDE IONS FROM ANION EXCHANGE RESINS USED TO EXTRACT IODINE

Hiromichi Nakamura, Tokyo, Hiroshi Katoo, Sakusabe-machi, Nobuaki Minejima, Mutsuzawa-mura, and Hiroshi Shimizu, Akira Satoo, Masashi Nozaki, and Yuu Doochi, Tokyo, Japan, assignors to Rohm and Haas Company, Philadelphia, Pa., a corporation of Delaware
No Drawing. Filed Feb. 24, 1967, Ser. No. 618,312
4 Claims. (Cl. 23—216)

ABSTRACT OF THE DISCLOSURE

This invention makes possible the recovery of iodide ions which have been absorbed by ion exchange resins used to extract the iodine from solutions containing iodide salts. It consists in adding to the eluate from the ion exchange resin column a mineral acid in sufficient quantity to bring the pH down to 3.0 or less, and adding chlorine gas to crystallize out the iodine.

---

This invention is a continuation-in-part of our application Ser. No. 364,788 which was filed on May 4, 1964.

The present invention pertains to a method for recovering iodine from a strongly basic anion exchange resin which has been used to absorb iodine liberated from iodine-containing solutions such as brine, natural gas well water, etc. The invention is especially and uniquely useful in the recovery of iodine from such solutions which also contain iodates, as the iodates cause great difficulties in the iodine recovery system as will be explained below.

A principal object of the invention is to provide a method for recovery of iodide ions by eluting them from the resin, and reusing the eluate for a successive elution of the iodide ions from the resin.

Another object is to provide a method for recovery of iodide ions by eluting them from the resin and crystallizing the iodine out of the eluate, removing the iodine from the eluate, and reusing the eluate for the next elution of the iodide ions from the resin.

Another object is to recovery iodide ions while at the same time essentially avoiding the recovery of iodate as an objectionable by-product.

In copending application Ser. No. 364,788 we disclosed a procedure for extracting iodine from a solution containing iodide ions in which chlorine is added to an acidic or nearly neutral solution of brine to liberate the iodine, and then this solution is contacted with an anion exchange resin (preferably a strongly basic quaternary ammonium or weakly basic polyamine resin) to absorb the iodine. Afterwards, the resin is treated with alkaline water solution to elute the iodine. When NaOH is the alkali used as the elutant, the reaction may be represented as follows:

$$3I_2 + 6NaOH \rightarrow 5NaI + NaIO_3 + 3H_2O$$
(Formula I)

For economy's sake, it is important to use as little as possible of the alkali to remove the NaI from the resin. For the sake of minimizing clogging of the resin bed and of the pipes, valves, etc. in the iodine recovery apparatus, it is important to minimize or preferably prevent entirely the precipitation of the $NaIO_3$.

In the course of the elution a small portion of the sodium iodide absorbed by the resin invariably fails to be eluted and remains on the resin exchange sites. Only by adding great excesses of concentrateed alkali can all of the iodide be eluted by this technique, and the cost of doing so is prohibitive in terms of the amount needed to elute the relatively small amount of iodine ions left on the resin.

Some of the iodine liberated by this alkaline water elution also remains absorbed on the resin as iodide ions, and thus a part of the anion exchange resin is put in the iodide form. Thus, in the next succeeding passage of the chlorinated brine over the resin, the iodide ions are wasted by passage with the effluent and thus cause a decrease in the overall eextraction ratio of iodine. To prevent this, it would be necessary to elute the remaining iodine with a large quantity of alkaline water solution at a considerably higher concentration, a very uneconomical procedure in terms of the alkali used and the considerable amount of acid to bring about its neutralization.

According to the present invention, the iodide ions which remain absorbed on the resin are eluted by slightly acidic or neutral sodium chloride water solution. This eluate is acidified with a mineral acid such as hydrochloric or sulfuric acid (represented in the following equation by the symbol HX):

$$5NaI + NaIO_3 + 6HX \rightarrow 3I_2 + 6NaX + 3H_2O$$
(Formula II)

To the acidified eluate is added chlorine gas to liberate the iodine which, upon crystallization, is filtered off. The filtrate, which essentially contains a salt (NaCl) and an acid (HCl), may be neutralized by the addition of alkali and reused in the elution process so as to make possible the further recovery of iodine independent of the main process in which iodine is eluted with caustic. This for a most efficient process in which practically 100% of the iodine which is adsorbed on the anion exchange resin is recovered, as the residual iodine can be removed from the anion exchanger by sodium chloride water solution which can be reused continuously.

The quantity of mineral acid added to the eluate in the just described process must be sufficient to bring the pH of the eluate down to about 3.0 or less, even as low as 0.5. This is essential when there is any iodate in the brine, for above a pH of 3.0 an iodate side product is formed. At a pH of 4.0, for example, the iodide ions begin to be converted to iodate during the chloride oxidation. As iodate precipitates out it tends to clog the pipes, valves, etc. in the equipment to the point where it seriously interferes with the efficiency of the system, and to leave deposits in the resin bed which will reduce the ion exchanging capability of the resins. The following table illustrates the adverse effect which occurs when the pH rises above 3.0.

| pH | Percent Iodine | Yield Iodate | No. Cycles Before Acid Treatment to Prevent Ppt. |
|---|---|---|---|
| 1.0 | 100 | 0 | (¹) |
| 2.0 | 100 | 0 | (¹) |
| 3.0 | 100 | 0 | (¹) |
| 4.0 | 93 | 7 | 20 |
| 5.0 | 85 | 15 | 10 |
| 8.0 | 65 | 35 | 2 |
| 10.0 | 0 | 100 | |

¹ More than 1,000.

The method employed in obtaining these data was that described in Example 1 below, the only changes being in the pH adjustment of the eluate brought about by the addition of HCl. As can be seen from these data, up to a pH of 3.0 no iodate precipitated out. One of the side benefits of this is the fact that over 1000 cycles of the described process were capable of being repeated without requiring the addition of any more acid to prevent iodate precipitation.

By sharp contrast, when the pH reached 4.0, 7% iodate precipitated out and only 20 cycles of the treatment could be repeated before more acid had to be added to keep more iodate from precipitating out. This situation got progressively worse as the pH was permitted to be increased even more.

In a variation of the invention as described above, after the iodine is liberated by the addition of chlorine, and the crystals are filtered off, the iodine which remains dissolved in the filtrate is removed by an adsorbent such as activated carbon. The filtrate, now free of its iodine, essentially is an aqueous NaCl solution, and it can be reused for eluting iodine which remains on the resin after the alkali elution treatment. The iodine on the activated carbon is recovered by means of caustic solution which liberates the iodine and, as before, the solution is acidified, chlorine is added to crystallize the iodine, and the crystals are removed by filtration.

Both methods serve not only to minimize the loss of the iodine which is absorbed by the anion exchange resin, but they also serve to minimize or even to dispense altogether with the need to use sodium hydroxide to neutralize the re-cycled brine solution. As a further consequence, the quantity of mineral acid required is minimized, as practically none is needed to neutralize the alkali.

A further advantage is that in using the sodium chloride solution as the elutriant, since it is in the acidic state and deprived of any free iodine, it can elute iodine ions more efficiently than does the above mentioned filtrate which contains NaCl and HCl, and has to be neutralized by the addition of alkali. At the same time, the sodium chloride solution serves to remove acid-soluble deposits and impurities in the resin column, thereby making possible a drop in the pressure during the process, and permitting the solution to pass smoothly through the resin. This, in turn, minimizes the lessening of the capacity of the ion exchange resin to absorb iodine.

Details regarding the manner of practicing the invention will be found in the following illustrations:

*Example I*

Natural gas well water containing 102 mg. of iodine per liter was filtered to remove dirt particles and other filterable impurities. To this iodine-containing water was added about 100 mg. of chlorine per liter, and the solution then was passed through two resin columns connected in series, each loaded with 12 liters of strongly basic quaternary ammonium anion exchange resins in the chloride form (e.g. Amberlite IRA-400 Cl, a product of Rohm & Haas Co., Philadelphia, Pa.). The passage of the solution over the resin was at a flow rate of 600 liters per hour. After 220 hours, when the concentration of free iodine in the effluent from the second column was 10 mg. per liter, passage of the well water through the column was stopped. The first column was separated from the system and through it was passed 50 liters of a water solution containing 100 g. of sodium hydroxide per liter, at 60° C. and at a flow rate of 24 liters per hour, to elute the iodine. This was followed by passage of 10 liters of warm water to add the resultant effluent to the first eluate.

Next, 60 liters of an aqueous solution containing 100 g. of sodium chloride per liter was passed through the resin at 60° C., and at a flow rate of 24 liters per hour, to elute the residual iodine ions from the resin. To this eluate, consisting of sodium chloride and dissolved iodine, was added hydrochloric acid until the pH became 1.5 and then chlorine gas was injected so as to precipitate out the iodine as crystals. After the precipitiate was filtered off, the filtrate was neutralized to a pH of 7.3 by addition of sodium hydroxide. In this filtrate there was present 95 g. per liter of sodium chloride, a loss of only 5 percent of the original concentration.

This filtrate containing the sodium chloride solution was reused to elute more iodide ions as follows. The same operation described above was repeated as far as the elution by the aqueous sodium hydroxide solution, followed by the warm water rinse. Following this, 60 liters of the filtrate from the previous operation containing sodium chloride solution was passed through the resin at 60° C. and at a flow rate of 24 liters per hour to elute the residual iodide ions on the resin. The amount of iodine recovered from this eluate was 1.4 kg., which was 10.5% of the total iodine in the treated well water.

The iodine in the eluate was recovered by adding mineral acid to make the solution slightly acid, then precipitating the iodine as crystals by an addition of chlorine. The crystals were filtered off, and the iodine remaining in the filtrate was absorbed on active carbon.

Some iodine was absorbed in the second column, but since it was not fully saturated with iodine it was capable of being reused for further iodine absorption. In practice, this second column is then used as the upper or first column in the succeeding treatment of well water. In fact, a preferred method is to employ three columns, two in series according to the method described above, and the third in a stand-by condition during which time the resin in that column can be regenerated with sodium chloride or sodium hydroxide. This technique has been termed a "merry-go-round" system, and has been described more fully in connection with a uranium absorption system by Dr. Robert Kunin in "Ion Exchange Resins," p. 194 (2nd ed., 1958, John Wiley & Sons, Inc., New York city).

*Example II*

The same treatment as in Example I was repeated to the point where the first column was separated from the system. Through this column was passed 50 liters of a water solution containing 100 g. of sodium hydroxide per liter at 60° C., at a flow rate of 24 liters per hour, to elute iodine from the resin. This was followed by the passage of 10 liters of warm water, and the resulting effluent was added to the eluate. Then, 60 liters of water acidified with hydrochloric acid to a pH of 1.5 and containing 100 g. of NaCl per liter was passed through the resin at a flow rate of 24 liters per hour to elute the residual iodide ions on the resin. To this eluate of acidic NaCl water solution, adjusted to a pH of 1.5 by the addition of a small quantity of HCl, was added chlorine which precipitated out the iodine. The crystals of iodine were filtered off, and the filtrate was passed through a column charged with 5 liters of granulated active carbon at a flow rate of 15 liters per hour. The iodine was thus removed from the filtrate which, incidentally, contained 94 g. of NaCl per liter (or a loss of only 6 percent of the original salt solution).

This filtrate containing the sodium chloride solution was reused to elute more iodide ions as follows. The same operation described above was repeated as far as the elution by the aqueous sodium hydroxide solution, followed by the warm water rinse. Then, 60 liters of the filtrate from the activated carbon column, containing the NaCl obtained from the preceding operation, was passed through the resin at a flow rate of 24 liters per hour to elute iodide ions. Iodine contained in this eluate was 1.52 kg., which was 11.3% of the total iodine in the treated well water.

As before, some iodine was absorbed in the second column. It was recovered in a succeeding cycle as explained in Example I.

*Example III*

The same treatment as in Example I was repeated to the point where the first column was separated from the system. Through this column was passed 50 liters of a water solution containing 100 g. of sodium hydroxide per liter at 60° C., at a flow rate of 24 liters per hour, to elute iodine from the resin. This was followed by the passage of 10 liters of warm water, and the resulting effluent was added to the eluate. Then, 60 liters of water acidified with hydrochloric acid to a pH of 0.5 and containing 100 g. of NaCl per liter was passed through the resin at a flow rate of 24 liters per hour to elute the residual iodide ions on the resin. To this eluate of acidic NaCl water solution, adjusted to a pH of 0.5 by the addition of a small quantity of HCl, was added chlorine which precipitated out the iodine. The crystals of iodine were filtered off, and the filtrate was passed through a column charged with 5 liters of granulated active carbon at a flow rate of 15 liters per hour. The iodine was thus removed from the filtrate which, incidentally, contained 94.5 g. of NaCl per liter (or a loss of only 5.5 percent of the original salt solution).

This filtrate containing the sodium chloride solution was reused to elute more iodide ions as follows. The same operation described above was repeated as far as the elution by the aqueous sodium hydroxide solution, followed by the warm water rinse. Then, 60 liters of the filtrate from the activated carbon column, containing the NaCl obtained from the preceding operation, was passed through the resin at a flow rate of 24 liters per hour to elute iodide ions. Iodine contained in this eluate was 1.48 kg., which was 10.8% of the total iodine in the treated well water.

As before, some iodine was absorbed in the second column. It was recovered in a succeeding cycle as explained in Example I.

*Example IV*

The same treatment as in Example I was repeated to the point where the first column was separated from the system. Through this column was passed 50 liters of a water solution containing 100 g. of sodium hydroxide per liter at 60° C., at a flow rate of 24 liters per hour, to elute iodine from the resin. This was followed by the passage of 10 liters of warm water, and the resulting effluent was added to the eluate. Then, 60 liters of water acidified with hydrochloric acid to a pH of 3.0 and containing 100 g. of NaCl per liter was passed through the resin at a flow rate of 24 liters per hour to elute the residual iodide ions on the resin. To this eluate of acidic NaCl water solution, adjusted to a pH of 3.0 by the addition of a small quantity of HCl, was added chlorine which precipitated out the iodine. The crystals of iodine were filtered off, and the filtrate was passed through a column charged with 5 liters of granulated active carbon at a flow rate of 15 liters per hour. The iodine was thus removed from the filtrate which, incidentally, contained 95 g. of NaCl per liter (or a loss of only 5 percent of the original salt solution).

This filtrate containing the sodium chloride solution was reused to elute more iodide ions as follows. The same operation described above was repeated as far as the elution by the aqueous sodium hydroxide solution, followed by the warm water rinse. Then, 60 liters of the filtrate from the activated carbon column, containing the NaCl obtained from the preceding operation, was passed through the resin at a flow rate of 24 liters per hour to elute iodide ions. Iodine contained in this eluate was 1.56 kg., which was 11.5 of the total iodine in the treated well water.

As before, some iodine was absorbed in the second column. It was recovered in a succeeding cycle as explained in Example I.

We claim:

1. In the extraction of iodine from an aqueous solution containing iodide salts by means of anion exchange resins, in which the principal quantity of iodide ions absorbed by the resin has been eluted therefrom by an aqueous solution of sodium hydroxide, the method for recovering the residual iodide ions from the resin which comprises contacting the resin with an elutriant from the class consisting of acidic and neutral sodium chloride solutions, adding to the eluate chlorine gas and sufficient mineral acid to bring the pH of the eluate down to between about 0.5 and about 3.0, whereupon the iodine is crystallized out of solution, and filtering off the iodine crystals.

2. The method of claim 1 followed by the additional steps of neutralizing with alkali the filtrate remaining after the iodine crystals are filtered off, and reusing this neutralized filtrate as the elutriant in the next elution of residual iodide ions from the resin.

3. The method of claim 1 followed by the additional steps of neutralizing with alkali the filtrate remaining after the iodine crystals are filtered off, passing this neutralized filtrate over activated carbon to remove any iodine dissolved therein, and reusing this neutralized filtrate as the elutriant in the next elution of residual iodide ions from the resin.

4. The method of claim 3 in which the activated carbon is contacted with aqueous sodium hydroxide solution to liberate the iodine therefrom, the resulting iodine-containing solution is neutralized with acid, chlorine is added to crystallize out the iodine, and the crystallized iodine is filtered off and collected.

References Cited

UNITED STATES PATENTS

| | | | |
|---|---|---|---|
| 1,897,031 | 2/1933 | Chamberlain | 23—217 |
| 1,907,975 | 5/1933 | Jones | 23—89 X |
| 1,916,094 | 6/1933 | Curtin | 23—217 |
| 1,936,553 | 11/1933 | Jones | 23—216 |
| 2,945,746 | 7/1960 | Shaw | 23—216 |
| 3,177,050 | 4/1965 | Houy | 23—216 |
| 3,219,409 | 11/1965 | Asher | 23—89 |

MILTON WEISSMAN, *Primary Examiner.*

EDWARD STERN, *Examiner.*